Patented Jan. 27, 1953

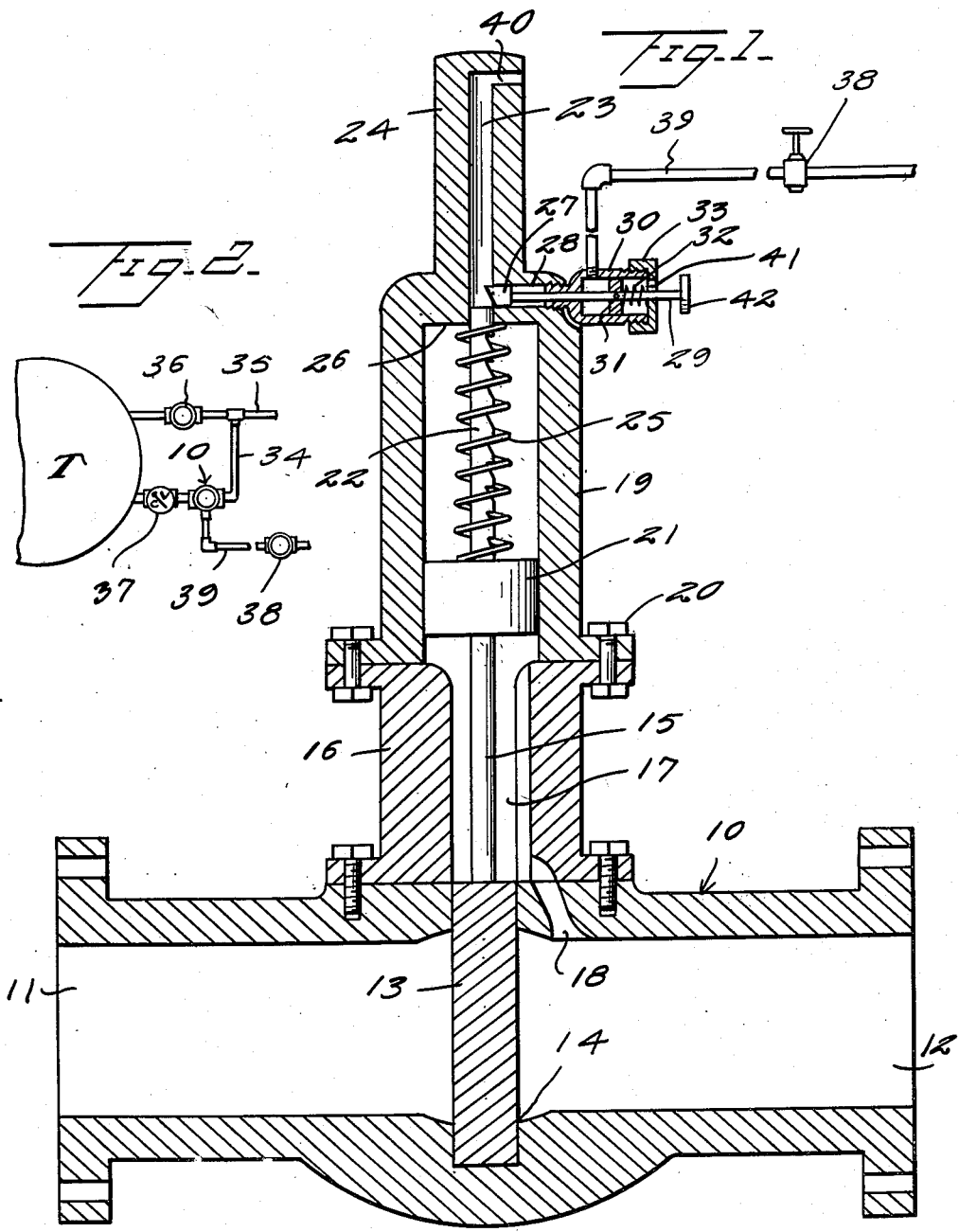

2,626,633

UNITED STATES PATENT OFFICE 2,626,633

PRESSURE OPERATED VALVE

Allen B. Wilson, Galena Park, Tex.

Application September 2, 1949, Serial No. 113,823

1 Claim. (Cl. 137—599)

This invention relates to pressure operated valves.

An object of this invention is to provide a valve structure which is moved to open position by means of pressure in the valve housing and is automatically latched in open position.

Another object of this invention is to provide a pressure valve structure which can be remotely controlled both as to opening and closing.

A further object of this invention is to provide a pressure valve structure which is adapted to be interposed in a pipe line through which inflammable liquid or gas flows, so that in the event of fire in a storage tank, the pipe line can be cut off from a remote point or may be opened to permit draining of the liquid from below the fire and subsequently closed.

A further object of this invention is to provide a pressure valve structure including a spring-pressed latch means for holding the valve plug in open position, the latch means being releasable by remotely controlled pressure means, or being manually releasable at the valve structure.

With the above and other objects in view, my invention consists in the arrangement, combination and details of construction disclosed in the drawing and specification, and then more particularly pointed out in the appended claim.

In the drawing,

Figure 1 discloses a vertical section of a pressure operated valve constructed according to an embodiment of this invention.

Figure 2 is a fragmentary diagrammatic view showing the manner of connecting this valve in the discharge system.

Referring to the drawing, the numeral 10 designates generally a valve housing provided with inlet and outlet ports 11 and 12 respectively. A gate valve plug 13 is slidably carried by the housing 10, engaging in guide channels 14, and a stem 15 is connected with the gate valve plug 13 and extends upwardly through a bushing 16.

The bushing 16 includes a passage 17 which is connected with the housing 10 on the outlet side thereof, through a connecting passage 18. A cylinder 19 is secured by fastening members 20 to the upper end of the bushing 16 and has slidably mounted therein a piston or plunger 21 which is fixed to the stem 15. The piston or plunger 21 has fixed to the upper side thereof a notched bar 22, which is slidable in the bore 23 of a housing 24 extending from the upper end of the cylinder 19.

A spring 25 engages about the bar 22, bearing at its lower end against the piston or plunger 21 and at its upper end against the head 26 of the cylinder 19 so as to constantly urge the piston 21 downwardly, and the valve plug 13 inwardly of the housing, to closed position. The notched bar 22 is adapted to be locked in its outer position by means of a locking bolt 27 which is slidable in a bore 28 extending laterally of the head 26. A stem 29 is fixed to the bolt 27 and extends through a cylinder 30 which is connected with the head 26. A piston or plunger 31 is fixed to the stem 29 within the cylinder 30, and a spring 32 bears against the piston 31 and against a cap 33 mounted on the cylinder 30 and constantly urges the bolt 27 inwardly to locking position.

The housing 10 is interposed in a bypass pipe 34 which is connected to a discharge pipe 35 having a manually controlled valve 36 interposed therein. A check valve 37 is interposed in pipe 34 between valve 10 and tank T, the check valve opening outwardly.

A second manual valve 38 is interposed in a pressure pipe line 39 and is positioned remote from valve 10 so that release pressure may be safely communicated with the release cylinder 30 for releasing the gate valve 13 to permit this valve member to move to closed position under the tension of spring 25. The upper portion of housing 24 is provided with a vent opening 40, and the cap 33 is also provided with a vent opening 41. A knob 42 is secured to the outer end of the stem 29 in order that bolt 27 may be manually operated without opening valve 38.

Preferably the valve structure 10 is mounted closely adjacent a tank T containing volatile liquid. The housing 10 is preferably connected to the bypass pipe line 34 so that in the event of fire in the tank the liquid below the fire may be drawn off without undue risk of injury to the workmen. The valve is preferably in normally closed position but may be opened from a remote position by putting back pressure in discharge line 35 with valve 36 closed. The pressure in valve housing 10 will be communicated to cylinder 19 through passages 18 and 17, thereby causing piston or plunger 21 to move outwardly and draw gate valve plug therewith to an open position. When piston 21 moves outwardly, spring-pressed bolt 27 will ratchet over notched bar 22 in order to hold the valve plug 13 in a selected open position. If it is desired to release valve plug 13 from a remote position, valve 38 may be opened, thereby communicating fluid pressure to release cylinder 30 and causing piston or plug 31 to move outwardly and draw therewith bolt 27. Bolt 27 may also be moved to an open position by manual engagement with knob 42.

With a valve structure as hereinbefore described, volatile liquids in tanks or supply reservoirs may be drawn off without injury to the workmen and with the drawing off of the bulk of the liquid in the tank or reservoir the fire hazard will be very substantially reduced.

I do not mean to confine myself to the exact details of construction herein disclosed, but claim all variations falling within the purview of the appended claim.

What I claim is—

A fluid pressure system for a tank having a discharge line, a control valve in the line operative to close said line, a second discharge line from the tank connected to the first-mentioned line on the outlet side of said control valve and having a check valve opening outwardly of the tank, a pressure responsive valve in said second discharge line having an outlet port in communication with said tank through said check valve, said pressure responsive valve having a plug and spring means for holding said plug in a normally closed position, a cylinder means communicated with said outlet port, a plunger having pressure responsive means thereon and disposed in said cylinder and connected to said plug for operative movement thereof to an open position in response to pressure in said outlet port, and releasable latch means engageable with said plunger for holding the plug in an open position.

ALLEN B. WILSON.

REFERENCES CITED

The following references are of record in the file of this patent:

UNITED STATES PATENTS

| Number | Name | Date |
|---|---|---|
| 2,327,055 | McMahon | Aug. 17, 1943 |
| 2,339,469 | Emanuel | Jan. 18, 1944 |

FOREIGN PATENTS

| Number | Country | Date |
|---|---|---|
| 94,049 | Sweden | of 1938 |
| 100,633 | Germany | of 1899 |